(12) United States Patent
Ueda

(10) Patent No.: US 9,702,311 B2
(45) Date of Patent: Jul. 11, 2017

(54) CONTROL DEVICE FOR INTERNAL COMBUSTION ENGINE

(71) Applicant: TOYOTA JIDOSHA KABUSHIKI KAISHA, Toyota-shi, Aichi-ken (JP)

(72) Inventor: Takanori Ueda, Susono (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 14 days.

(21) Appl. No.: 14/765,894

(22) PCT Filed: Feb. 5, 2014

(86) PCT No.: PCT/JP2014/052667
§ 371 (c)(1),
(2) Date: Aug. 5, 2015

(87) PCT Pub. No.: WO2014/123154
PCT Pub. Date: Aug. 14, 2014

(65) Prior Publication Data
US 2015/0369155 A1 Dec. 24, 2015

(30) Foreign Application Priority Data
Feb. 6, 2013 (JP) ................. 2013-021755

(51) Int. Cl.
*F01N 3/10* (2006.01)
*F01N 9/00* (2006.01)
(Continued)

(52) U.S. Cl.
CPC ......... *F02D 41/1446* (2013.01); *F01N 3/106* (2013.01); *F01N 9/002* (2013.01);
(Continued)

(58) Field of Classification Search
CPC ........ F01N 3/106; F01N 9/002; F01N 3/0253; F01N 3/035; F02D 41/029;
(Continued)

(56) References Cited

U.S. PATENT DOCUMENTS 7,669,410 B2 * 3/2010 Nagaoka ............ B01D 53/9495
60/274
2007/0130925 A1 6/2007 Ueno

FOREIGN PATENT DOCUMENTS

| JP | 53-100314 | 9/1978 |
|----|-----------|--------|
| JP | 11-62553  | 3/1999 |

(Continued)

*Primary Examiner* — Mark Laurenzi
*Assistant Examiner* — Brandon Lee
(74) *Attorney, Agent, or Firm* — Finnegan, Henderson, Farabow, Garrett & Dunner, LLP

(57) ABSTRACT

There is provided a control device for an internal combustion engine provided with a filter on the downstream side of a catalyst having an oxidation function, the device including: a control unit performing oxygen concentration reduction control for reducing the oxygen concentration of exhaust gas flowing into the catalyst based on an exhaust temperature increase request on the downstream side of the catalyst made when regeneration of the filter is performed, in which the control unit is configured to acquire an S concentration value of a fuel combusted in the internal combustion engine, and in which the oxygen concentration is set based on the S concentration value. Accordingly, the white smoke resulting from combination between $SO_3$ and $H_2O$ can be suppressed while filter regeneration is performed.

6 Claims, 11 Drawing Sheets

(51) Int. Cl.
*F02D 41/14* (2006.01)
*F02D 41/02* (2006.01)
*F01N 3/025* (2006.01)
*F01N 3/035* (2006.01)
*F02D 41/00* (2006.01)

(52) U.S. Cl.
CPC ....... *F02D 41/029* (2013.01); *F02D 41/1454* (2013.01); *F01N 3/0253* (2013.01); *F01N 3/035* (2013.01); *F02D 41/0055* (2013.01); *F02D 2200/0611* (2013.01); *F02D 2250/38* (2013.01); *Y02T 10/47* (2013.01)

(58) Field of Classification Search
CPC ............. F02D 41/1446; F02D 41/1454; F02D 2200/0611; F02D 2250/38; F02D 41/0055; Y02T 10/47
See application file for complete search history.

(56) References Cited

FOREIGN PATENT DOCUMENTS

| | | |
|---|---|---|
| JP | 3216382 | 8/2001 |
| JP | 2004-144072 A | 5/2004 |
| JP | 2005-16387 | 1/2005 |
| JP | 2007-162568 | 6/2007 |
| JP | 2008-106687 | 5/2008 |
| JP | 2011-247212 | 12/2011 |
| WO | WO 2012/126892 A1 | 9/2012 |

\* cited by examiner

RELATIONSHIP BETWEEN S DEPOSIT AMOUNT
AND FUEL S CONCENTRATION VALUE

RELATIONSHIP BETWEEN FUEL S CONCENTRATION
VALUE (ppm) AND OXYGEN CONCENTRATION REDUCTION
CONTROL IMPLEMENTATION PERIOD τ trg

EFFECT OF PM REGENERATION
A/F ON WHITE SMOKE (A)

WHITE SMOKE SUPPRESSION TARGET A/F trg
(OXYGEN CONCENTRATION CANDIDATE)
AND OXYGEN CONCENTRATION REDUCTION CONTROL
IMPLEMENTATION PERIOD τ trg (PERIOD CANDIDATE) BY DESTINATION (B)

CONTROL DEVICE FOR INTERNAL COMBUSTION ENGINE

CROSS-REFERENCE TO RELATED APPLICATIONS

This application is a national phase application of International Application No. PCT/JP2014/052667, filed Feb. 5, 2014, and claims the priority of Japanese Application No. 2013-021755, filed Feb. 6, 2013, the content of both of which is incorporated herein by reference.

TECHNICAL FIELD

The invention relates to a control device for an internal combustion engine.

BACKGROUND ART

It is known that sulfur dioxide ($SO_2$) contained in exhaust from an internal combustion engine becomes sulfur trioxide ($SO_3$) in an oxidation catalyst and then becomes $H_2SO_4$ through a reaction with water ($H_2O$). $H_2SO_4$ is turned into white smoke (sulfate white smoke) and discharged to the atmosphere in some cases. This chemical reaction is disclosed in PTL 1. In PTL 1, it is also disclosed that $SO_3$ becomes more likely to be generated as the amount of surplus oxygen in the oxidation catalyst increases when an exhaust gas temperature becomes equal to or higher than a predetermined temperature and the surplus oxygen is decreased so as to avoid a rapid increase in the amount of $SO_3$ sulfuric acid mist attributable thereto.

CITATION LIST

Patent Literature

PTL 1: Japanese Patent Application Publication No. 53-100314

SUMMARY OF THE INVENTION

As described above, $SO_3$ becomes $H_2SO_4$ by reacting with $H_2O$. The oxidation catalyst has SOx adsorption characteristics. Accordingly, the white smoke may be generated in quantity during the regeneration of a filter (for example, a diesel particulate filter: DPF) that is disposed with the oxidation catalyst and captures particulate matter (PM). In other words, the sulfur component (S component) contained in a fuel combusted in the internal combustion engine and the adsorbed SOx adsorbed by the oxidation catalyst and desorbed due to an increase in an exhaust temperature resulting from a filter regeneration request may become white smoke. A decrease in surplus oxygen for suppressing the generation of $SO_3$ that causes the white smoke as described above is disclosed in PTL 1 described above. Oxygen is required for PM regeneration in the filter, and it is considered that the amount of oxygen required for the PM regeneration of the filter is not ensured when the amount of the oxygen is excessively decreased, which affects the PM regeneration. The PTL 1 described above does not take the filter regeneration such as the PM regeneration into account, and it is considered to be difficult to appropriately suppress white smoke generation while performing filter regeneration.

An object of a control device for an internal combustion engine disclosed in this specification is to suppress white smoke resulting from combination between $SO_3$ and $H_2O$ while performing filter regeneration.

In order to solve such a problem, a control device for an internal combustion engine disclosed in the present specification is a control device for an internal combustion engine provided with a filter on the downstream side of a catalyst having an oxidation function, the device including: a control unit performing oxygen concentration reduction control for reducing the oxygen concentration of exhaust gas flowing into the catalyst based on an exhaust temperature increase request on the downstream side of the catalyst made when regeneration of the filter is performed, in which the control unit is provided with means for acquiring an S concentration value of a fuel combusted in the internal combustion engine, and in which the oxygen concentration is set based on the S concentration value. Oxygen is required during the regeneration of the filter that is disposed in an exhaust path and is arranged on the downstream side of the catalyst which has the oxidation function. When the oxygen concentration is excessively high, $SO_2$ resulting from the combustion of the fuel containing an S component is oxidized to cause $SO_3$ to be generated. Likewise, the sulfur S component deposited in the catalyst and the filter is also desorbed and oxidized to become $SO_3$. The $SO_3$ that is generated as described above is combined with $H_2O$, becomes $H_2SO_4$, and is turned into mist, that is, white smoke. In a case where the exhaust temperature increase request during the regeneration of the material deposited in the filter, mainly particular matter (PM), is recognized, the oxygen concentration reduction control is performed so as to suppress the white smoke resulting from the combination between the $SO_3$ and $H_2O$. In this manner, white smoke generation can be suppressed.

The control unit may set an upper limit threshold of the oxygen concentration in accordance with the S concentration value. Further, the control unit may set an implementation period for the oxygen concentration reduction control to become longer as the S concentration value increases. This allows for a difference between white smoke-generating situations depending on the fuel S concentration value.

The control unit may control the oxygen concentration of the exhaust gas to a fixed value set in advance during the oxygen concentration reduction control. This fixed value may be a value that is selected from a plurality of values prepared in advance. The control unit may control an implementation period for the oxygen concentration reduction control to a fixed period set in advance. In a case where the S concentration value of the fuel used in the internal combustion engine is already known or in a case where the S concentration value of the fuel used in the internal combustion engine is assumed, an oxygen concentration and an oxygen concentration reduction control implementation period correlated with the S concentration value by prior adaptation are available.

The control unit may control the oxygen concentration of the exhaust gas to a value set in accordance with the S concentration value of the fuel combusted in the internal combustion engine during the oxygen concentration reduction control. The control unit may control the implementation period for the oxygen concentration reduction control to a period set in accordance with the S concentration value of the fuel combusted in the internal combustion engine.

According to the control device for an internal combustion engine disclosed in this specification, white smoke generation can be suppressed while filter regeneration is performed.

MODES FOR CARRYING OUT THE INVENTION

Figure 1:
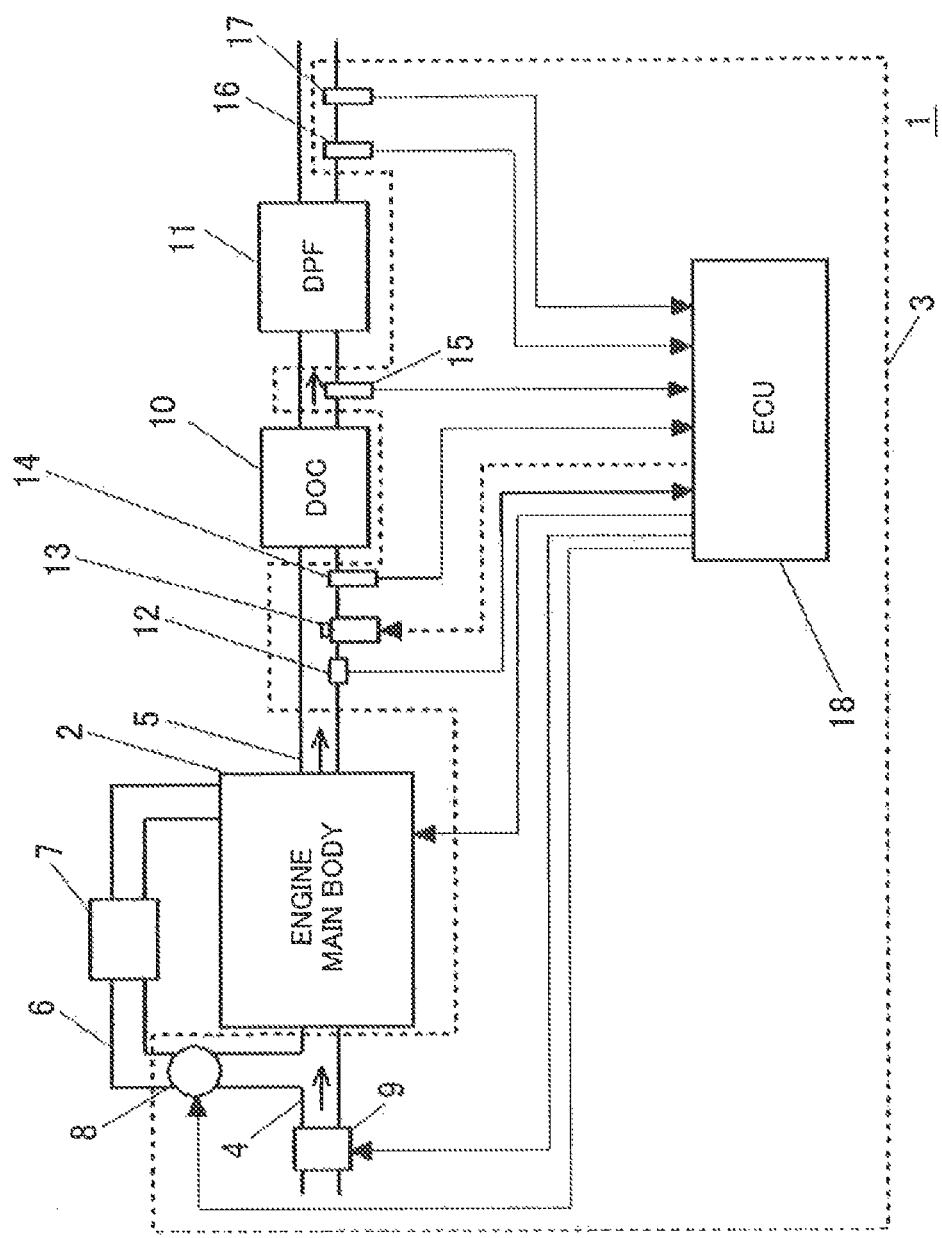
FIG. 1 is an explanatory drawing illustrating a schematic configuration of an internal combustion engine according to an embodiment.

Hereinafter, an embodiment of the invention will be described with reference to accompanying drawings. The dimension, ratio, and the like of each part in the drawings may not completely correspond to actual ones, and the illustration of certain parts may be omitted in the drawings.

Embodiment

FIG. 1 is an explanatory drawing illustrating a schematic configuration of an internal combustion engine 1 according to the embodiment. The internal combustion engine 1 is provided with an engine main body 2 and a control device 3 for the internal combustion engine (hereinafter, referred to as the control device). An intake passage 4 and an exhaust passage 5 are connected to the engine main body 2. One end of an exhaust gas recirculation (EGR) passage 6 is connected to the engine main body 2. The other end of the EGR passage 6 is connected to the intake passage 4. An EGR cooler 7 and an EGR valve 8 are arranged in the EGR passage 6. A throttle 9 is arranged in the intake passage 4. A diesel oxidation catalyst (DOC) 10 is arranged in the exhaust passage 5. The DOC 10 is a catalyst that has an oxidation function. A diesel particulate filter (DPF) 11 is arranged on the downstream side of the DOC 10 in the exhaust passage. The DPF 11 is a PM supplementation filter.

A SOx sensor 12, an exhaust addition fuel valve 13, and a first temperature sensor 14 are arranged, in order from the upstream side, between the engine main body 2 and the DOC 10 in the exhaust passage 5. The SOx sensor 12, as is the case with an A/F sensor 17 (described later), includes means for acquiring the S concentration value (hereinafter, referred to as a fuel S concentration value) of a fuel that is combusted in the internal combustion engine 1, more specifically, in the engine main body 2. The exhaust addition fuel valve 13 adds the fuel to exhaust gas by injecting the fuel into the exhaust passage 5. The fuel-added exhaust gas is combusted by the DOC 10 and becomes high-temperature exhaust gas. The first temperature sensor 14 measures the temperature of the exhaust gas introduced into the DOC 10 (DOC temperature, catalyst-containing gas temperature).

A second temperature sensor 15 is arranged between the DOC 10 and the DPF 11 in the exhaust passage 5. The second temperature sensor 15 measures the temperature of the exhaust gas introduced into the DPF 11 (DPF temperature).

A third temperature sensor 16 and the A/F sensor 17 are arranged, in order from the upstream side, on the downstream side of the DPF 11 in the exhaust passage 5. The third temperature sensor 16 measures the temperature of the exhaust gas discharged from the DPF 11. The DPF temperature, that is, a catalyst bed temperature Tm, is found out based on a value measured by the third temperature sensor 16 and a value measured by the second temperature sensor 15. The A/F sensor 17 measures an exhaust A/F. As described above, the A/F sensor 17 includes means for acquiring the fuel S concentration value as is the case with the SOx sensor 12. The fuel S concentration value and exhaust SOx concentration have a correlation. Accordingly, the fuel S concentration value can be calculated by adaptation from the exhaust SOx concentration value detected by the SOx sensor 12 and the exhaust A/F. The SOx discharged from the engine main body 2 is substantially $SO_2$, and thus the SOx sensor may be a $SO_2$ sensor.

The internal combustion engine 1 is provided with an electronic control unit (ECU) 18. The ECU 18 performs various types of control on the internal combustion engine 1 while functioning as a control unit of the control device 3 by being included in the control device 3. The ECU 18 is electrically connected to the EGR valve 8, the throttle 9, the SOx sensor 12, the exhaust addition fuel valve 13, the first temperature sensor 14, the second temperature sensor 15, the third temperature sensor 16, and the A/F sensor 17 and forms the control device 3.

The ECU 18, which functions as the control unit, performs oxygen concentration reduction control for reducing the concentration of the oxygen that flows into the DOC 10 based on an exhaust temperature increase request on the downstream side of the DOC 10 during the regeneration of the DPF 11, more specifically, a PM regeneration request in the DPF 11. The oxygen concentration reduction control is implemented at a timing when an exhaust temperature increase request establishment condition is satisfied. The oxygen concentration reduction control may be implemented in a stage where the exhaust temperature increase request establishment condition is predicted to be satisfied.

Figure 2:
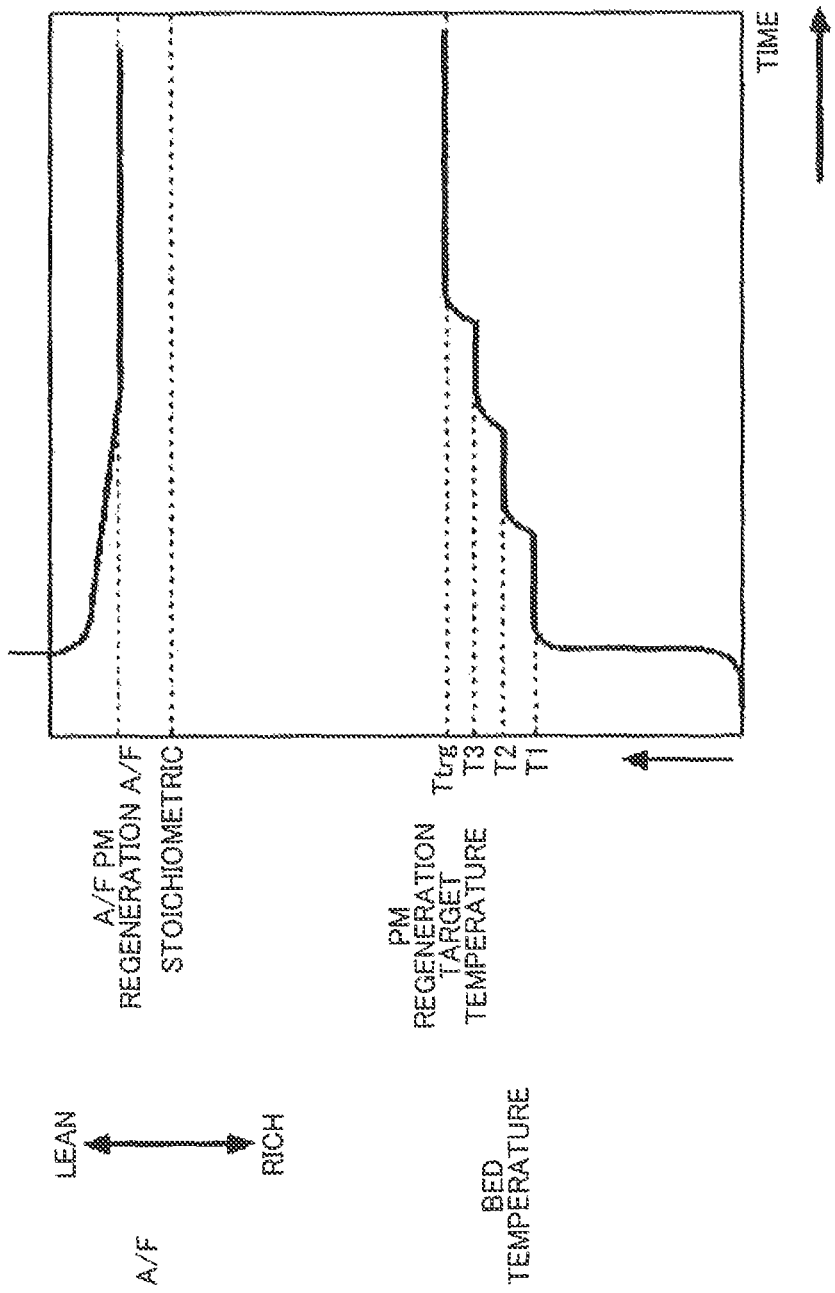
FIG. 2 is an example of a time chart pertaining to when PM generation is performed according to a comparative example.

FIG. 2 illustrates an example of a normal PM regeneration chart according to a comparative example. Referring to FIG. 2, the A/F during the PM regeneration is set to be in a lean region. The bed temperature has to be raised to a PM regeneration target temperature for the PM generation to be performed. However, a rapid A/F change may cause an excessive bed temperature rise, and thus the A/F is gradually changed. Specifically, the A/F in the lean region is allowed to gradually approach a PM regeneration A/F and the bed temperature is raised in stages from a temperature T1 to the PM regeneration target temperature Ttrg through a temperature T2 and a temperature T3. When the PM regeneration A/F is reached, the PM regeneration target temperature Ttrg is substantially reached and the PM regeneration is carried out. Herein, the direction of the A/F change is a direction from the lean side toward stoichiometric, that is, a direction in which the oxygen concentration is reduced.

Figure 3:
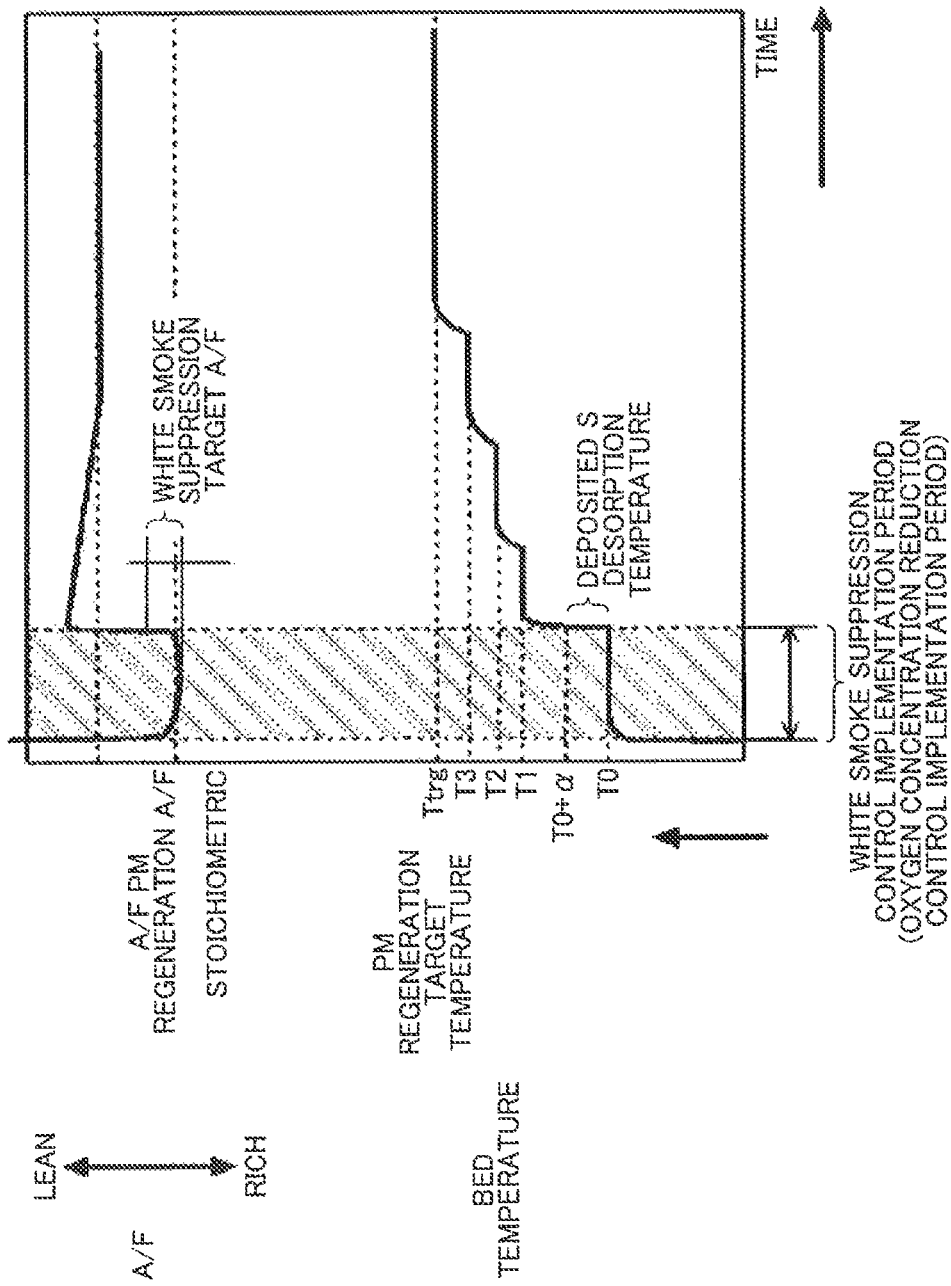
FIG. 3 is an example of a time chart of PM regeneration performed by a control device of the internal combustion engine according to the embodiment.

FIG. 3 illustrates an example of a PM regeneration chart according to this embodiment, in which the A/F is controlled toward a side directed toward a rich state in the early stage of a PM regeneration measure. In other words, the oxygen concentration is controlled to be reduced in the early stage of the PM regeneration measure. This control for reducing the oxygen concentration may be control that reduces the oxygen concentration. In other words, the oxygen concentration reduction control includes not only a case where the rich state is achieved beyond stoichiometric but also a case where the stoichiometric state is approached. Referring to FIG. 3, a white smoke suppression A/F is set with ranges preceding and following stoichiometric used as references in this embodiment. This white smoke suppression A/F is set for the bed temperature to be directed toward a deposited S desorption temperature T0 at which the sulfur S deposited in the DOC 10 and the DPF 11 is desorbed. More specifically, a constant width is given to a target temperature and the white smoke suppression A/F is set for the bed temperature to reach T0+α from the deposited S desorption temperature T0. In this embodiment, control for the white smoke suppression A/F is carried out in a white smoke suppression implementation period in the early stage of the PM regeneration measure, that is, during an oxygen concentration reduction control implementation period, and the S desorption is performed in a state where the oxygen concentration is reduced, so that white smoke generation is suppressed. After the oxygen concentration reduction control implementation period is over, the bed temperature is raised in stages from the temperature T1 to the PM regeneration target temperature Ttrg through the temperature T2 and the temperature T3 as in the comparative example illustrated in FIG. 2. In this manner, the PM regeneration is completed.

When the oxygen concentration reduction control is performed as described above, the amount of the oxygen remaining in the exhaust gas decreases. Accordingly, the generation of $SO_3$, which causes the generation of the $H_2SO_4$ that is regarded as the white smoke, can be suppressed. The oxygen concentration reduction control includes the following measures. The purposes of the respective measures are as follows.

The ECU 18 sets an oxygen concentration based on the fuel S concentration value. This is in view of an increase in the exhaust S concentration in response to the fuel S concentration value. In addition, the ECU 18 sets an upper limit threshold of the oxygen concentration in accordance with the fuel S concentration value. An upper limit value of the oxygen concentration is, in other words, a lean upper limit value. To become lean means a relative increase in air amount, and thus the upper limit value of the oxygen concentration being set is to prevent the air mount from becoming excessive. The $SO_3$ is generated when the $SO_2$ discharged from the engine main body 2 and the $SO_2$ deposited in the DOC 10 and the DPF 11 are oxidized. The S concentration in the exhaust gas increases in accordance with the fuel S concentration value, and thus the generation of the $SO_3$ can be effectively suppressed when the upper limit value of the oxygen concentration is set in accordance with the fuel S concentration value.

It is known that the generation of the white smoke is recognized when the concentration of $SO_3$ exceeds a certain threshold (white smoke generation threshold). It is known that a period when the concentration of $SO_3$ exceeds the white smoke generation threshold depends on the fuel S concentration value. The higher the fuel S concentration value, the longer the period when the concentration of $SO_3$ exceeds the white smoke generation threshold. The ECU 18 sets the oxygen concentration reduction control implementation period to become longer as the fuel S concentration value increases.

Figure 4A:
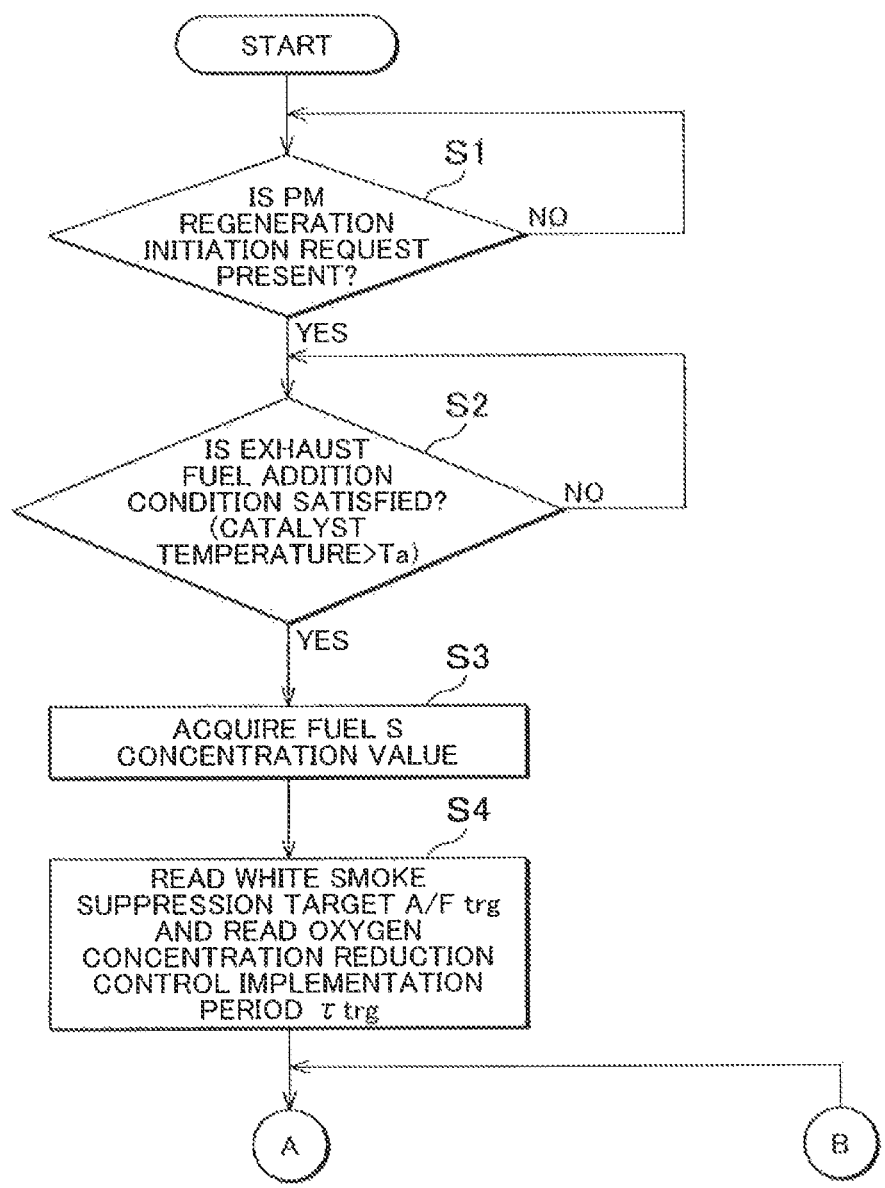
FIG. 4A and FIG. 4B are a flow diagram illustrating an example of control performed by the control device of the internal combustion engine according to the embodiment.
Figure 4B:
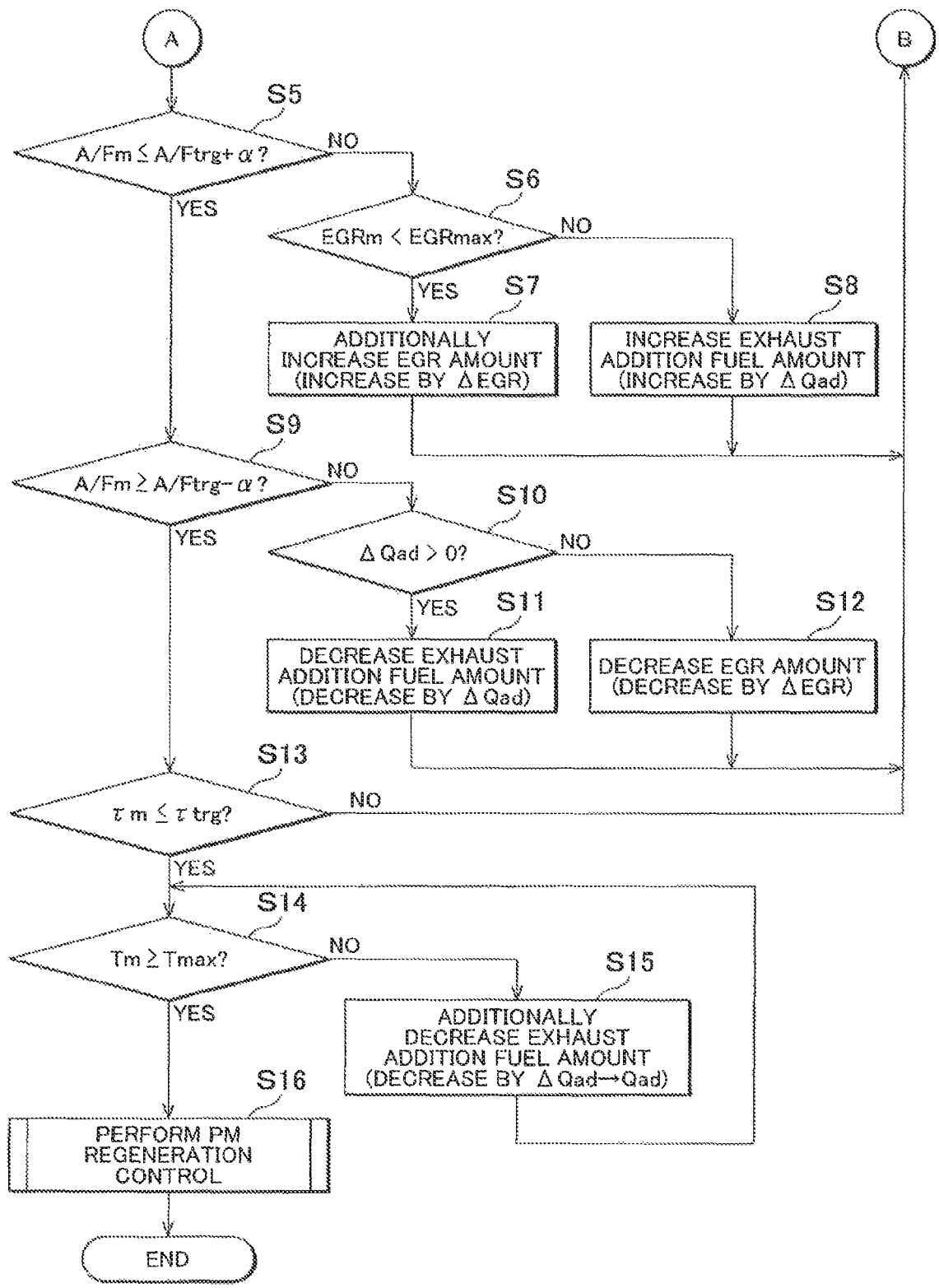

Hereinafter, an example of control performed by the control device 3 will be described with reference to the flow diagram illustrated in FIG. 4A and FIG. 4B.

Firstly, in Step S1, the presence or absence of a PM regeneration initiation request is determined. The presence or absence of the PM regeneration request is determined based on an estimated value regarding a PM deposit amount at that point in time. In other words, a Yes determination is made in a case where the estimated value for the PM deposit amount exceeds a threshold determined in advance. The PM deposit amount is calculated by integrating PM generation amounts obtained from moment-to-moment operation states of the engine main body 2, that is, by integrating the PM generation amounts based on a fuel injection history. When a Yes determination is made in Step S1, the PM regeneration control is initiated and the processing proceeds to Step S2. When a No determination is made in Step S1, the processing of Step S1 is repeated until a Yes determination is made in Step S1. During the PM regeneration, the exhaust temperature increase request on the downstream side of the DOC 10 (catalyst) is made. Accordingly, during the PM regeneration control, the state of the exhaust gas is allowed to be combustion mode and the A/F is controlled for approaching a state where the PM regeneration is performed. The A/F is controlled by adjusting the degrees of opening of the EGR valve 8 and the throttle 9. The A/F control during the PM regeneration is performed by, for example, referring to a map.

In Step S2, it is determined whether or not an exhaust fuel addition condition for raising the bed temperature is satisfied. Specifically, it is determined whether or not the catalyst-containing gas temperature measured by the first temperature sensor 14 exceeds a threshold Ta. This threshold Ta is set based on the viewpoint of whether or not the added fuel can reach a state allowing combustion. The processing proceeds to Step S3 when a Yes determination is made in Step S2. When a No determination is made in Step S2, the processing of Step S2 is repeated until a Yes determination is made in Step S2.

In Step S3, the fuel S concentration value is acquired. The fuel S concentration value is acquired based on the values measured by the SOx sensor 12 and the A/F sensor 17 as described above. The fuel S concentration value may be obtained from a value that is measured by a fuel property sensor which is installed in place of the SOx sensor 12.

Figure 5:
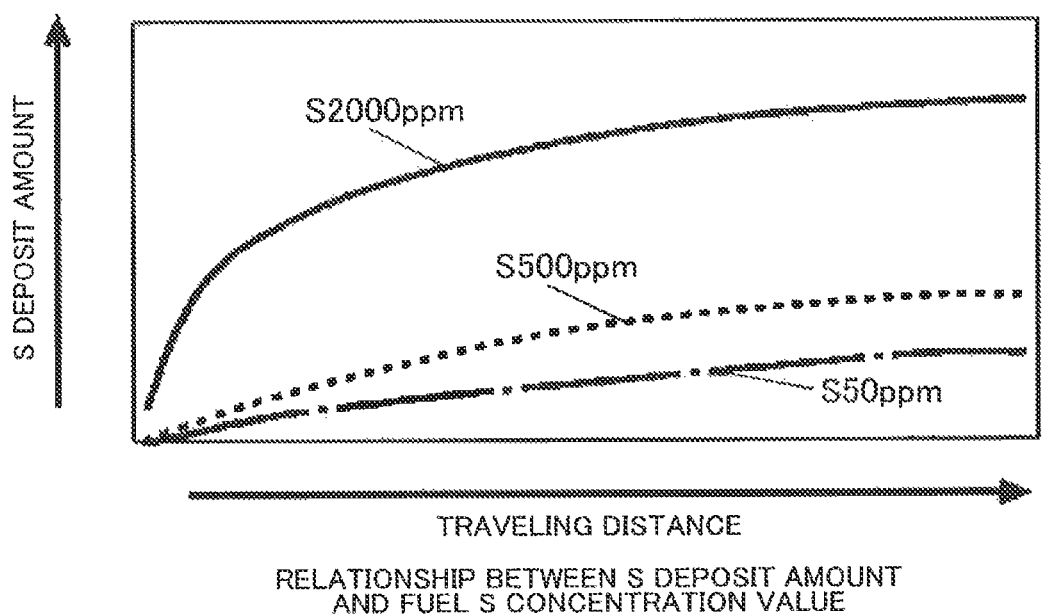
FIG. 5 is an explanatory drawing illustrating a relationship between an S deposit amount and a fuel S concentration value.
Figure 6:
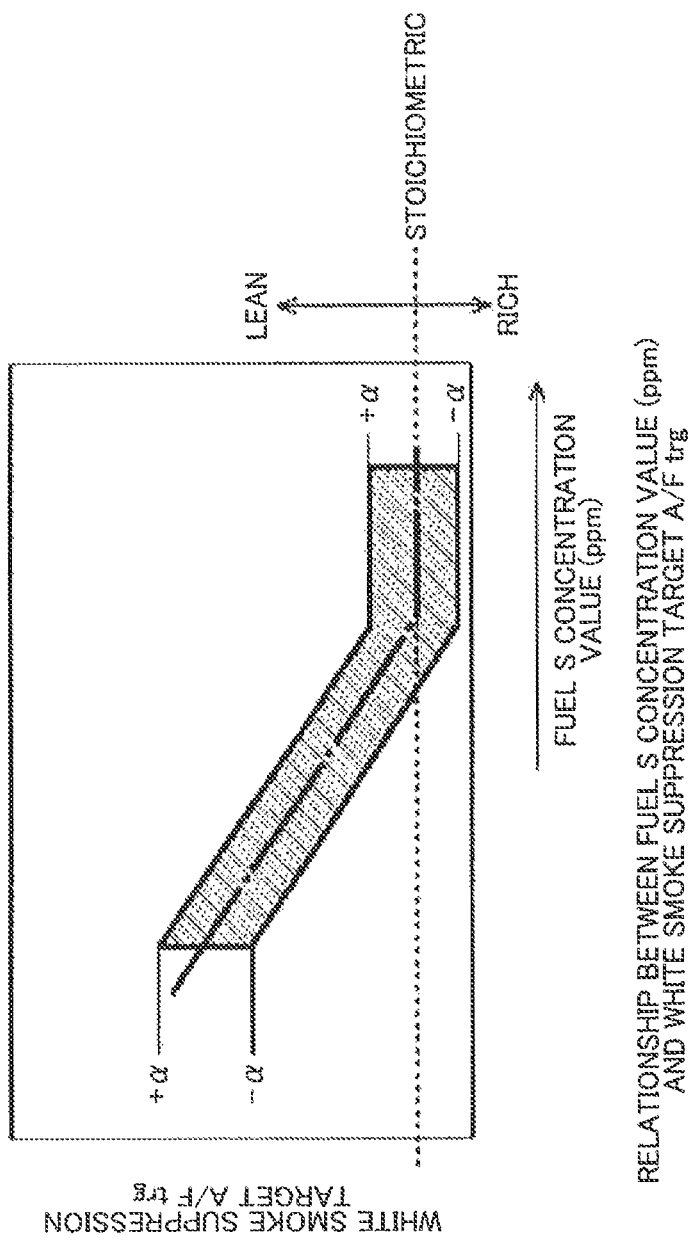
FIG. 6 is a graph illustrating a relationship between the fuel S concentration value and a white smoke suppression target A/F.

In Step S4, which follows Step S3, a white smoke suppression target A/F trg and an oxygen concentration reduction control implementation period τtrg are read. Hereinafter, a relationship between the S deposit amount in the DOC 10 and the DPF 11 and the fuel S concentration value will be described in detail. FIG. 5 illustrates a relationship between a vehicle traveling distance and the S deposit amount with regard to three types of fuels that have different fuel S concentration values. The fuel S concentration values are of the three types of 2,000 ppm, 500 ppm, and 50 ppm. FIG. 5 shows that the S deposit amount increases as the fuel S concentration value increases. When the S deposit amount is large, an S emission amount during the PM regeneration increases in response thereto. Accordingly, $SO_3$ becomes more likely to be generated and the white smoke becomes more likely to be generated as the fuel S concentration value increases. When the fuel S concentration value is high as described above, $SO_3$, and eventually the white smoke, may be generated in quantity. In other words, an excessive rich-direction control is unnecessary when the fuel S concentration value is not so high. Herein, the white smoke suppression target A/F trg in accordance with the fuel S concentration value is set as illustrated in FIG. 6. Specifically, the white smoke suppression target A/F trg is controlled toward the rich side as the fuel S concentration value increases. This constitutes a white smoke countermeasure in accordance with the fuel S concentration value. Referring to FIG. 6, an upper limit threshold of the white smoke suppression target A/F trg is set. Specifically, the range of to from a reference A/F in response to the fuel S concentration value makes a tolerance range for the white smoke suppression target A/F trg. Although the white smoke can be suppressed on a side richer than the white smoke suppression target A/F trg, the generation of the white smoke can be suppressed while oxygen is supplied to the DPF 11 in the lean state or in a state close to the lean state when the upper limit value of the oxygen concentration in accordance with the fuel S concentration value is provided. In this case, fuel economy deterioration can be suppressed. The range of $\pm \alpha$ allows for difficulty in controlling the A/F to an accurately targeted value.

Figure 7:
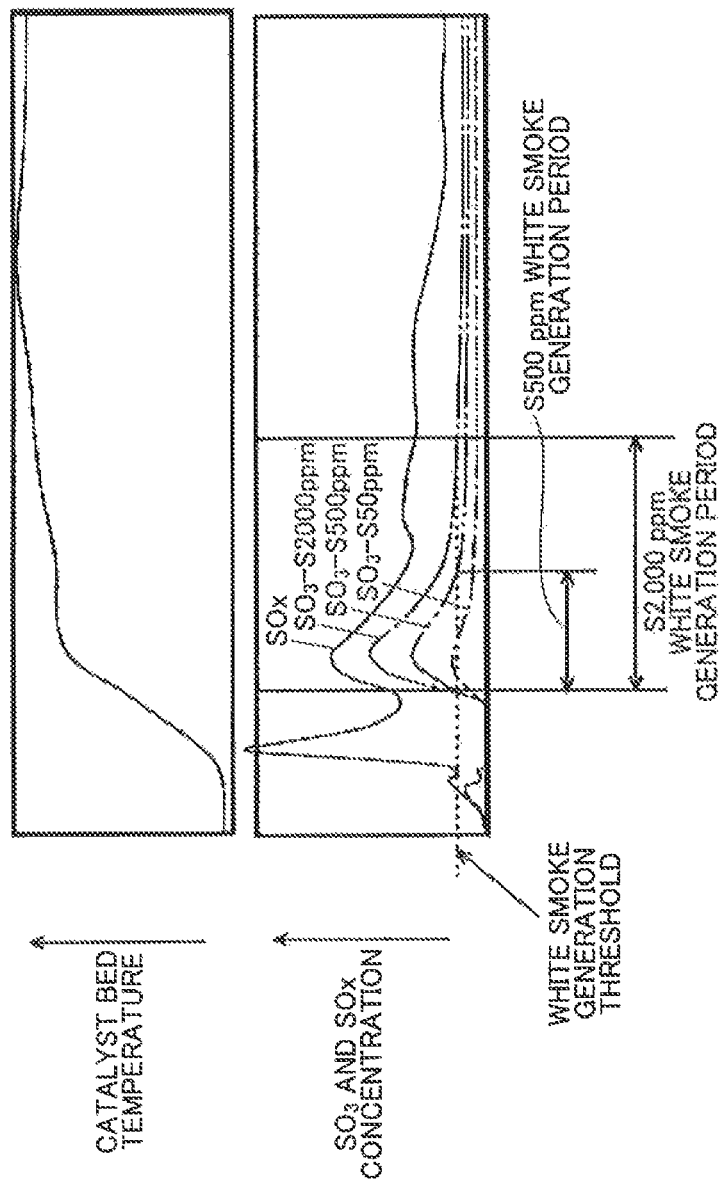
FIG. 7 is a graph illustrating a white smoke-generating situation.
Figure 8:
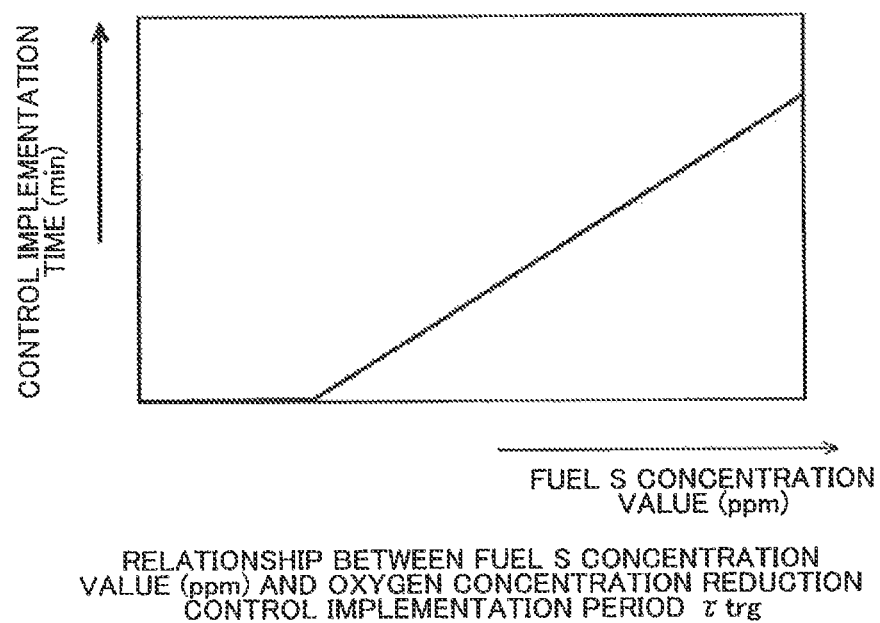
FIG. 8 is a graph illustrating a relationship between the fuel S concentration value and an oxygen concentration reduction control implementation period.

Hereinafter, a difference between white smoke-generating situations depending on a difference in fuel S concentration value will be described with reference to FIG. 7. It is known that $SO_3$, which causes the white smoke, is generated as a result of a rise in a catalyst bed temperature. The white smoke is recognized when the concentration of $SO_3$ exceeds a predetermined threshold (white smoke generation threshold). FIG. 7 shows that a white smoke-generating period when $SO_3$ exceeds the white smoke generation threshold extends as the fuel S concentration value increases. Accordingly, in order to effectively suppress the white smoke, the oxygen concentration reduction control implementation period $\tau trg$ needs to be set to become longer as the fuel S concentration value increases, as illustrated in FIG. 8, in view of the white smoke-generating period when $SO_3$ exceeds the white smoke generation threshold.

In Step S5, which follows Step S4, it is determined whether or not an A/Fm measured by the A/F sensor 17 is equal to or less than the white smoke suppression target A/F trg+$\alpha$ illustrated in FIG. 6. The processing proceeds to Step S6 when a No determination is made in Step S5. In Step S6, it is determined whether or not an EGRm, which is a value that is calculated as the EGR amount at that point in time, is exceeded by an EGRmax as an allowed EGR amount. The processing proceeds to Step S7 when a Yes determination is made in Step S6. In Step S7, an additional increase in EGR amount by $\Delta EGR$ is performed. The increase in EGR amount is a part of a measure for oxygen concentration reduction. The processing proceeds to Step S8 when a No determination is made in Step S6. In Step S8, an increase in exhaust addition fuel amount by $\Delta Qad$ is performed. The increase in exhaust addition fuel amount is a part of the measure for oxygen concentration reduction. In a case where the increase in exhaust addition fuel amount is performed in Step S8, a new exhaust addition fuel amount, which is increased by $\Delta Qad$ from the exhaust addition fuel amount at that point in time, is set. Step S6 to Step S8 constitute a main part of the oxygen concentration reduction control. The measure of Step S6 to Step S8 has the purpose of oxygen concentration reduction as the tolerance range of the white smoke suppression target A/F trg, that is, the upper limit value of the oxygen concentration is exceeded when a No determination is made in Step S5. As means to that end, the increase in EGR amount is performed and the air amount is reduced in Step S7. In Step S8, control based on the EGR amount cannot be carried out, and thus the A/F is reduced based on fuel addition. Accordingly, the point in time when the additional increase in EGR amount in Step 37 is initiated or the point in time when the increase in exhaust addition fuel amount in Step S8 is initiated is the point in time when the oxygen concentration reduction control is initiated, and the measurement of elapsed time $\tau m$ is initiated from the point in time of the initiation. The processing from Step S5 is repeated after the processing of Step S7 and Step S8 is terminated.

The processing proceeds to Step S9 when a Yes determination is made in Step S5. In Step S9, it is determined whether or not the A/Fm measured by the A/F sensor 17 is equal to or less than the white smoke suppression target A/F trg-$\alpha$. The processing proceeds to Step S10 when a No determination is made in Step S9. In Step S11, it is determined whether or not $\Delta Qad$ exceeds zero, that is, whether or not the increase in exhaust addition fuel amount has been performed. The processing proceeds to Step S11 when a Yes determination is made in Step S10. In Step S11, a decrease in exhaust addition fuel amount by the increased $\Delta Qad$ is performed. In other words, a new exhaust addition fuel amount, which is decreased by $\Delta Qad$ from the exhaust addition fuel amount at that point in time, is set. The processing proceeds to Step S12 when a No determination is made in Step S10. In Step S12, a decrease in EGR amount by $\Delta EGR$ is performed. The measure of Step S10 to Step S12 has the purpose of maintaining an adequate air concentration as the tolerance range of the white smoke suppression target A/F trg is exceeded when a No determination is made in Step S9. As means to that end, the decrease in exhaust addition fuel amount is performed in Step S11. In Step S12, control based on the exhaust addition fuel cannot be carried out, and thus the EGR amount is decreased and the A/F is maintained. The processing from Step S5 is repeated after the processing of Step S11 and Step S12 is terminated.

Setting of a lower limit value of the oxygen concentration is not important in view of the suppression of white smoke generation. An excessively low oxygen concentration, however, may result in an increase in CO, HC, $H_2S$, and PM. Accordingly, it is desirable to maintain the A/F within an appropriate range.

The white smoke suppression target A/F trg is controlled within the tolerance range when the processing of Step S5 to Step S12 is performed. When the white smoke suppression target A/F trg is controlled as described above, the catalyst temperature is set to substantially correspond to the deposited S desorption temperature.

The processing proceeds to Step S13 when a Yes determination is made in Step S9. In Step S13, it is determined whether or not the elapsed time $\tau m$ from the point in time when the implementation of the oxygen concentration reduction control is initiated, that is, the point in time when the additional increase in EGR amount in Step S7 is initiated or the point in time when the increase in exhaust addition fuel amount in Step S8 is initiated, is equal to or longer than the oxygen concentration reduction control implementation period $\tau trg$ read in Step S4. The processing from Step S5 is repeated when a No determination is made in Step S13. The processing proceeds to Step S14 when a Yes determination is made in Step S13.

In Step S14, it is determined whether or not the measured catalyst bed temperature Tm is equal to or higher than a temperature Tmax. The temperature Tmax is the temperature that is the maximum temperature during a PM regeneration transition and corresponds to T1 in FIG. 3. The processing proceeds to Step S15 when a No determination is made in Step S14. In Step S15, the exhaust addition fuel is decreased in amount and the A/F is subjected to a transition to the lean side. The A/F is subjected to the transition to the lean side with the amount decreased by ΔQad from the exhaust addition fuel amount at the point in time set as a new exhaust addition fuel amount. The processing of Step S16 is performed when a Yes determination is made in Step S14. In other words, a transition to a normal PM regeneration control illustrated in FIG. 2 is performed. In other words, the bed temperature is raised in stages from the temperature T1 to the PM regeneration target temperature Ttrg through the temperature T2 and the temperature T3. In this manner, the PM regeneration is completed. Although Step S16 is a sub-routine, the processing is terminated (ends) when this sub-routine is terminated.

Figure 9:
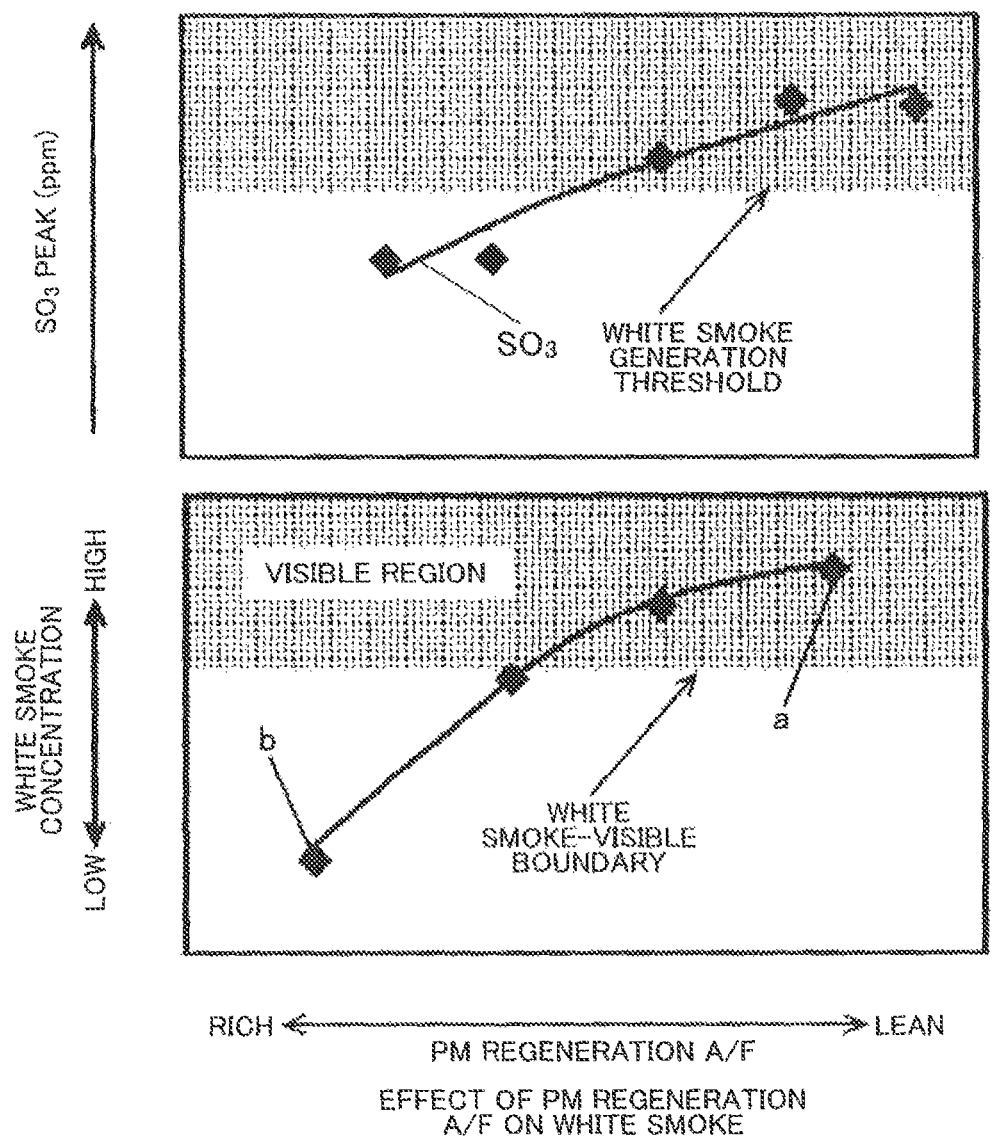
FIG. 9 is a graph illustrating an effect that an A/F has on white smoke during the PM regeneration.

An example of the control performed by the control device 3 has been described above. Hereinafter, an effect that the A/F has on the white smoke during the PM regeneration will be described with reference to FIG. 9. FIG. 9 is a graph illustrating the effect that the PM regeneration A/F has on the white smoke. FIG. 9 shows that the concentration of $SO_3$ is reduced to be lower than the white smoke generation threshold as the PM regeneration A/F approaches the rich and that the white smoke concentration is also reduced as a result of the reduction in $SO_3$ concentration. It is known that white smoke generation is suppressed when the oxygen concentration reduction control, examples of which include an increase in EGR amount, is performed and the PM regeneration A/F is subjected to a transition from point a to point b. In this manner, the A/F is controlled within the tolerance range of the white smoke suppression target A/F trg as in the control described above with reference to FIG. 4A and FIG. 4B, and PM regeneration can be realized while the white smoke is suppressed.

Modification Example

In a case where the S concentration value of the fuel used in the internal combustion engine is already known or in a case where the S concentration value of the fuel used in the internal combustion engine is assumed, an oxygen concentration and an oxygen concentration reduction control implementation period correlated with the S concentration value by prior adaptation are available. In this case, the measure of Step S3 and Step S4 is omitted. In many cases, the S concentration value of the fuel used in the internal combustion engine is approximated depending on destinations. Herein, adaptation by destination allowing for the S concentration value assumed in advance can be performed and the oxygen concentration in the exhaust gas, that is, the white smoke suppression target A/F trg, can be allowed to have a fixed value. This fixed value may be a value that is set in accordance with the S concentration value of the fuel combusted in the internal combustion engine 1. Likewise, the oxygen concentration reduction control implementation period may be set to a period that is set in accordance with the S concentration value of the fuel combusted in the internal combustion engine 1. When the oxygen concentration is set by adaptation as described above, the oxygen concentration is set to decrease as the assumed S concentration value increases. When the oxygen concentration reduction control implementation period is set by adaptation, in addition, the period is set to extend as the assumed S concentration value increases. This implementation period may be a period that is set in accordance with the S concentration value of the fuel combusted in the internal combustion engine 1.

Figure 10:
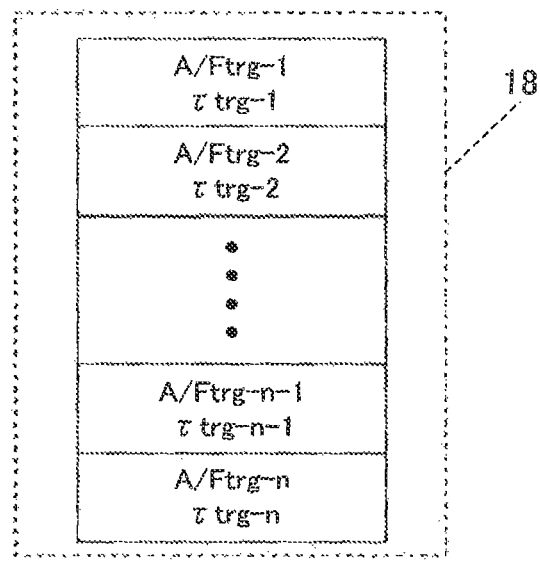
FIG. 10(A) is an explanatory drawing schematically illustrating how candidates of fixed values by pre-arranged destination are stored.
FIG. 10(B) is an explanatory drawing schematically illustrating how the fixed values are set to fit the destinations.
Figure 10:
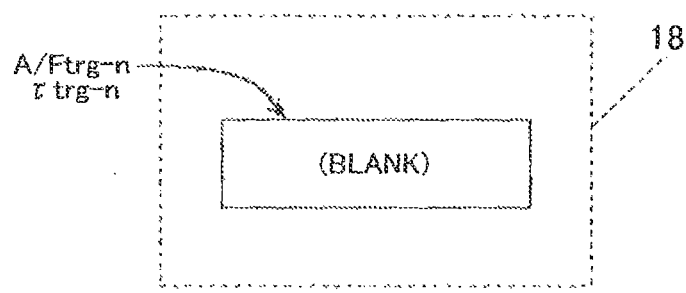

Referring to FIG. 10(A), the ECU 18 stores the oxygen concentration by destination, more specifically, the white smoke suppression target A/F trg-n. The oxygen concentration reduction control implementation period τtrg-n is also stored therein. In other words, the ECU 18 is prepared in a state where universality is given and selects the white smoke suppression target A/F trg-n and the implementation period τtrg-n in accordance with the destination when a destination is determined. In this manner, a state is achieved where the oxygen concentration reduction control is performed based on the fixed value corresponding to the destination. As a method for setting the fixed value, in addition, the initial white smoke suppression target A/F trg-n and implementation period τtrg-n in the ECU are set blank as illustrated in FIG. 10(B). When a destination is determined, the white smoke suppression target A/F trg-n and the implementation period τtrg-n in the ECU corresponding to the destination are written. In this manner, a state is achieved where the oxygen concentration reduction control is performed based on the fixed value corresponding to the destination.

The embodiment described above is merely an example for implementing the invention, and the invention is not limited thereto. Various modifications of the embodiment are also included within the scope of the invention, and it is apparent from the above description that various other embodiments are also possible within the scope of the invention.

REFERENCE SIGNS LIST

1 . . . INTERNAL COMBUSTION ENGINE, 2 . . . ENGINE MAIN BODY, 3 . . . CONTROL DEVICE, 4 . . . INTAKE PASSAGE, 5 . . . EXHAUST PASSAGE, 10 . . . DOC, 11 . . . DPF, 12 . . . SOx SENSOR, 13 . . . EXHAUST ADDITION FUEL VALVE, 17 . . . A/F SENSOR, 18 . . . ECU

The invention claimed is:
1. A control device for an internal combustion engine, the internal combustion engine including a catalyst having an oxidation function, and a filter disposed on the downstream side of the catalyst, the control device comprising:
an electronic control unit configured to
i) perform oxygen concentration reduction control based on an exhaust temperature increase request on a downstream side of the catalyst made when regeneration of the filter is performed, wherein the oxygen concentration reduction control includes reducing an oxygen concentration of exhaust gas flowing into the catalyst,
ii) acquire a sulfur concentration value of a fuel combusted in the internal combustion engine,
iii) set an oxygen concentration control value based on the sulfur concentration value,
iv) set an upper limit threshold of the oxygen concentration in accordance with the sulfur concentration value, and
v) reduce the oxygen concentration of exhaust gas flowing into the catalyst by controlling a valve based on the oxygen concentration control value and the upper limit threshold of the oxygen concentration.

2. The control device according to claim 1,
wherein the electronic control unit is configured to control an implementation period for the oxygen concentration reduction control to a fixed period set in advance.

3. The control device claim 1,
wherein the electronic control unit is configured to control the oxygen concentration of the exhaust gas to a value set in accordance with the sulfur concentration value of the fuel combusted in the internal combustion engine during the oxygen concentration reduction control.

4. The control device according to claim 1,
wherein the electronic control unit is configured to control an implementation period for the oxygen concentration reduction control to a period set in accordance with the sulfur concentration value of the fuel combusted in the internal combustion engine.

5. A control device for an internal combustion engine, the internal combustion engine including a catalyst having an oxidation function, and a filter disposed on the downstream side of the catalyst, the control device comprising:
an electronic control unit configured to
  i) perform oxygen concentration reduction control based on an exhaust temperature increase request on a downstream side of the catalyst made when regeneration of the filter is performed, wherein the oxygen concentration reduction control includes reducing an oxygen concentration of exhaust gas flowing into the catalyst,
  ii) acquire a sulfur concentration value of a fuel combusted in the internal combustion engine,
  iii) set an oxygen concentration control value based on the sulfur concentration value,
  iv) set an implementation period for the oxygen concentration reduction control to become longer as the sulfur concentration value increases, and
  v) reduce the oxygen concentration of exhaust gas flowing into the catalyst by controlling a valve based on the oxygen concentration control value and the implementation period.

6. A control device for an internal combustion engine, the internal combustion engine including a catalyst having an oxidation function, and a filter disposed on the downstream side of the catalyst, the control device comprising:
an electronic control unit configured to
  i) perform oxygen concentration reduction control based on an exhaust, temperature increase request on a downstream side of the catalyst made when regeneration of the filter is performed, wherein the oxygen concentration reduction control includes reducing an oxygen concentration of exhaust gas flowing into the catalyst,
  ii) acquire a sulfur concentration value of a fuel combusted in the internal combustion engine,
  iii) set an oxygen concentration control value based on the sulfur concentration value, and
  iv) control the oxygen concentration of the exhaust gas to the oxygen concentration control value by controlling a valve during the oxygen concentration reduction control, wherein the oxygen concentration control value is a fixed value set in advance.

* * * * *